B. T. BROWN.
BALER.
APPLICATION FILED OCT. 13, 1910.

1,027,393.

Patented May 21, 1912.
9 SHEETS—SHEET 1.

WITNESSES:
G. H. Boink
O. M. McLaughlin

INVENTOR.
Braselton T. Brown
BY
V. H. Lockwood
ATTORNEY.

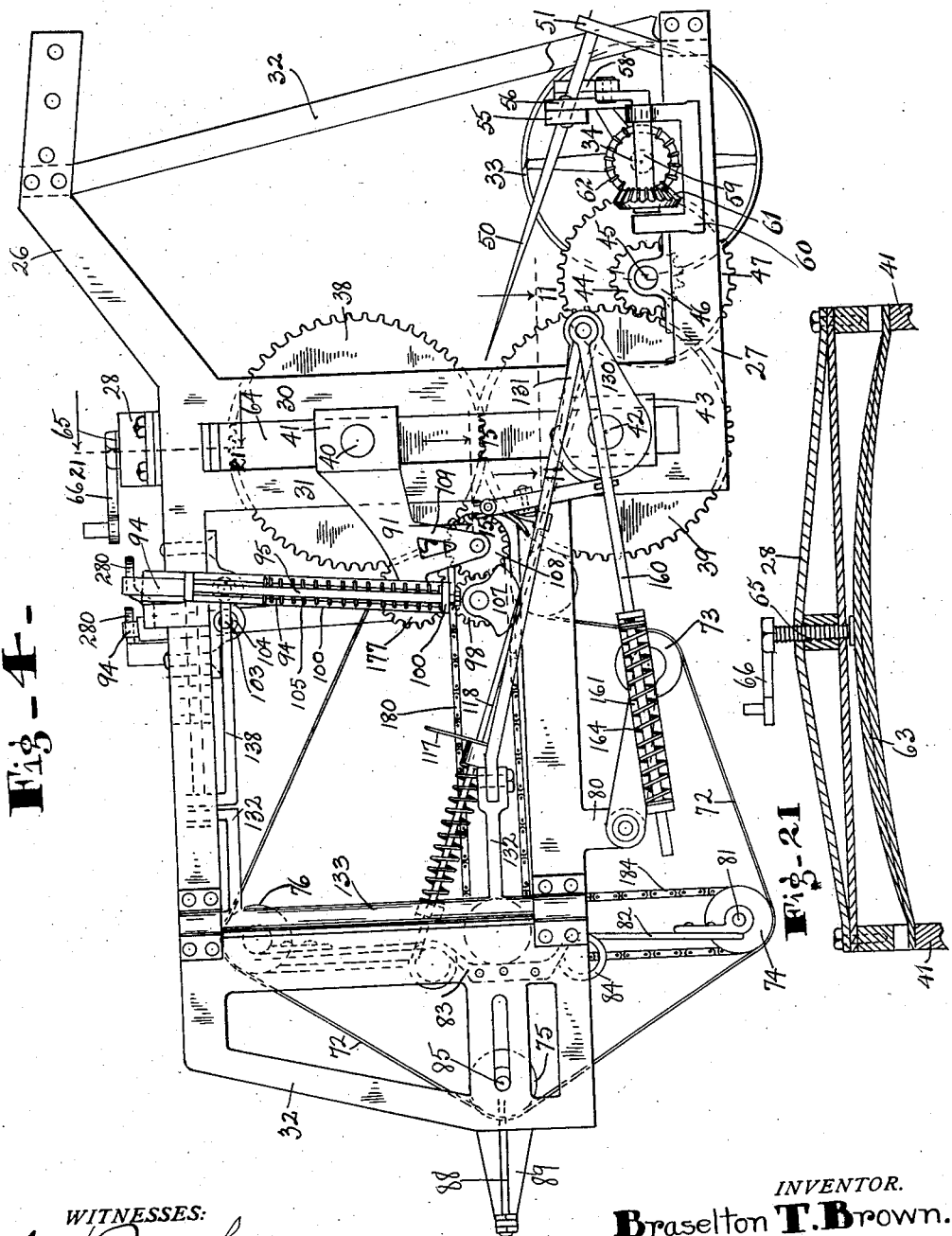

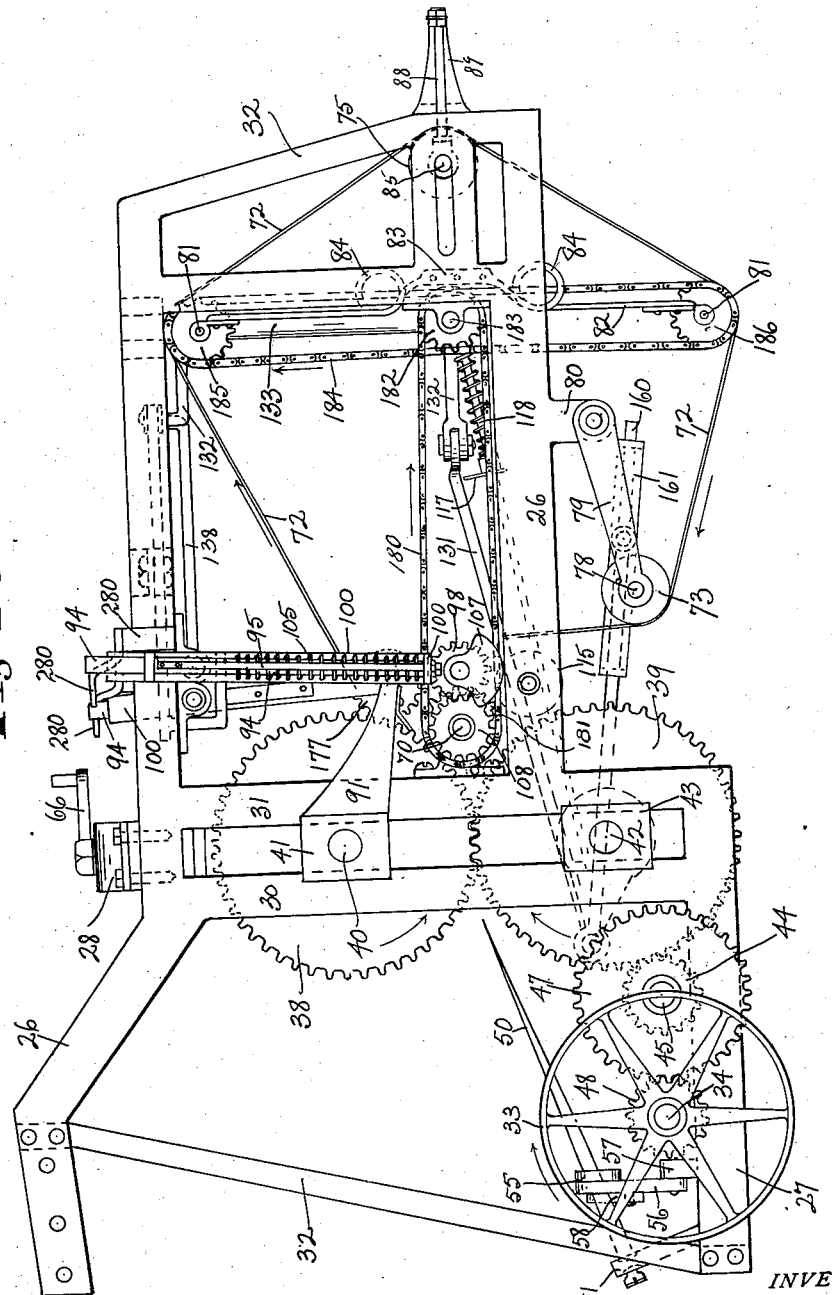

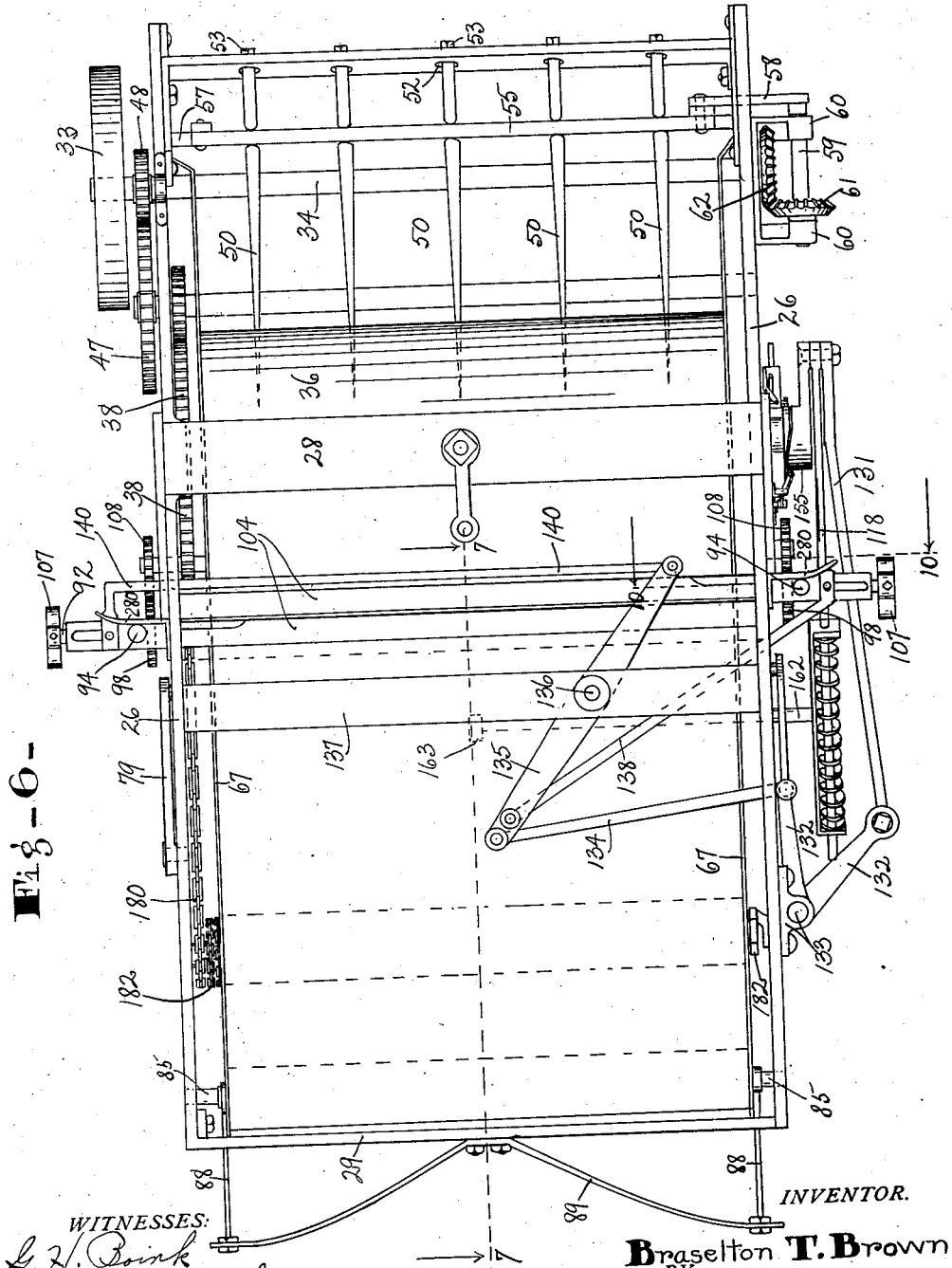

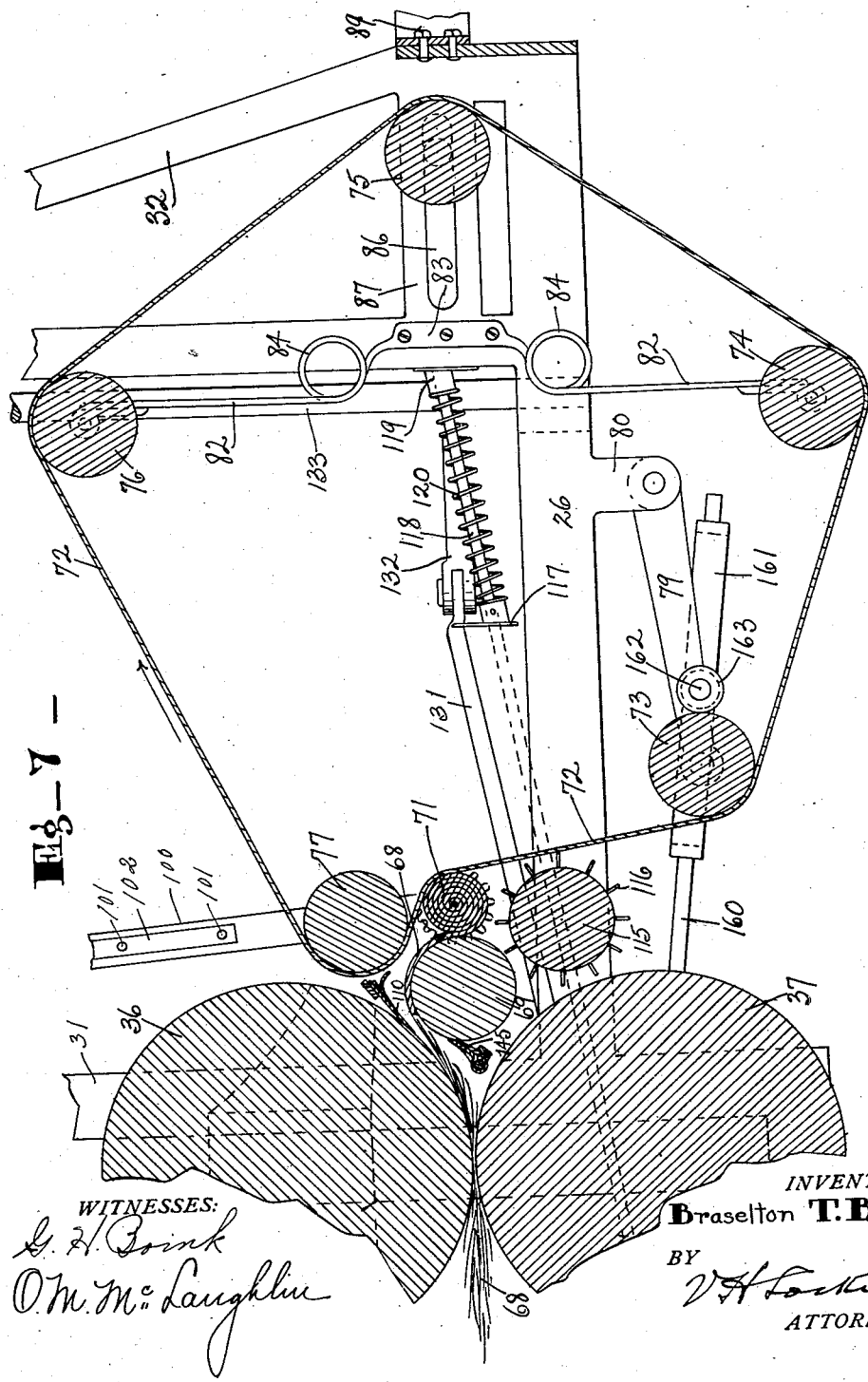

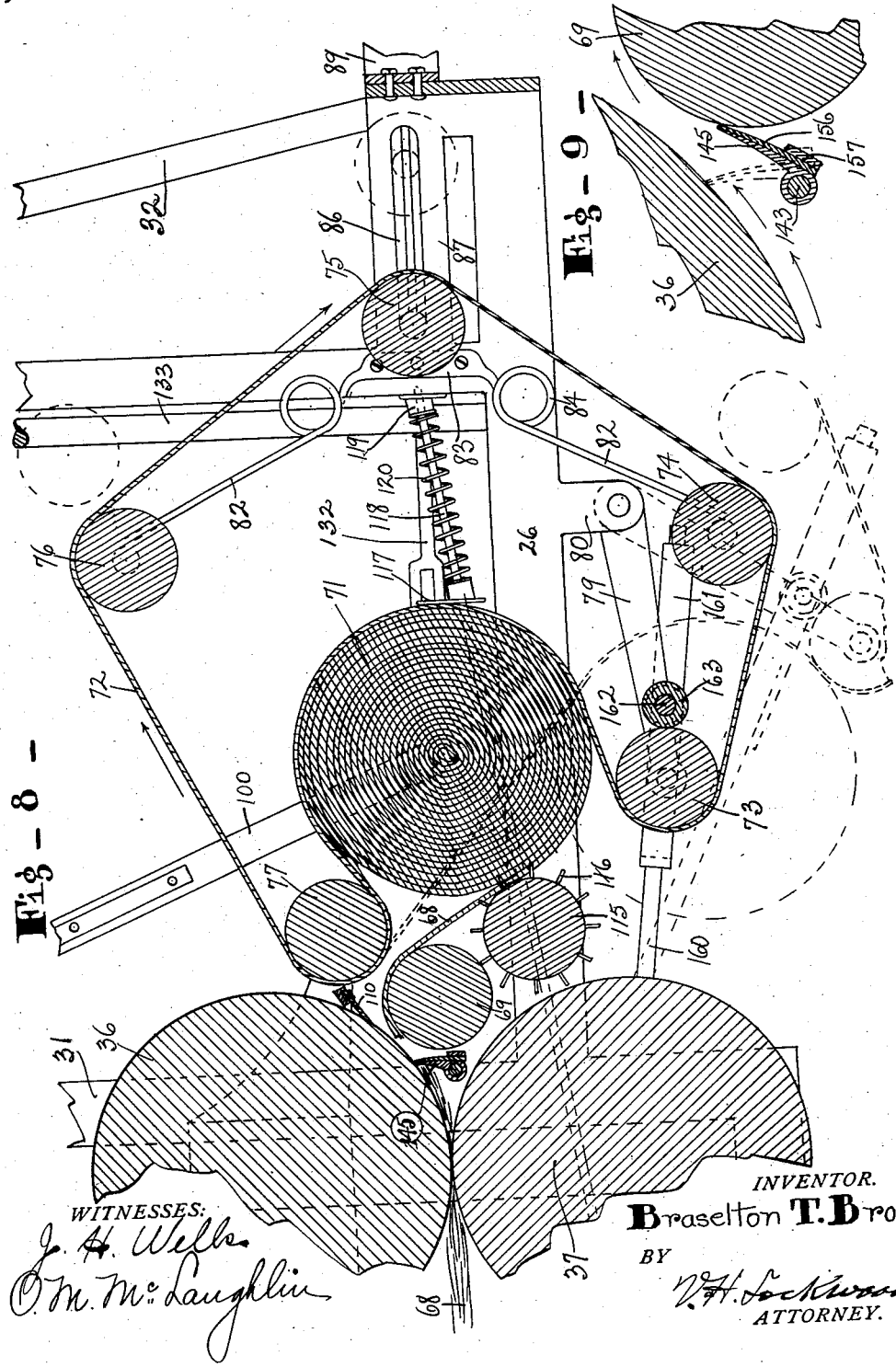

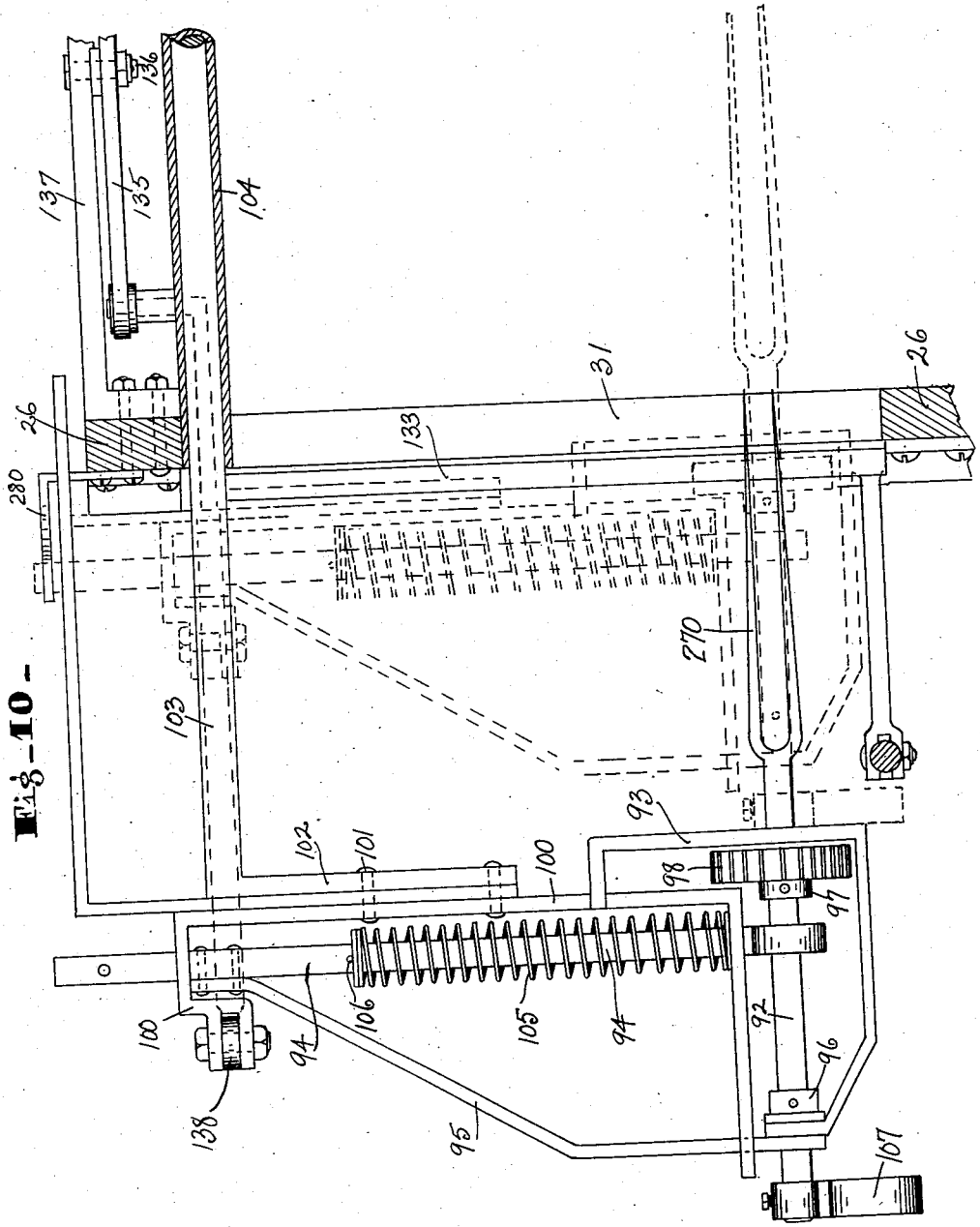

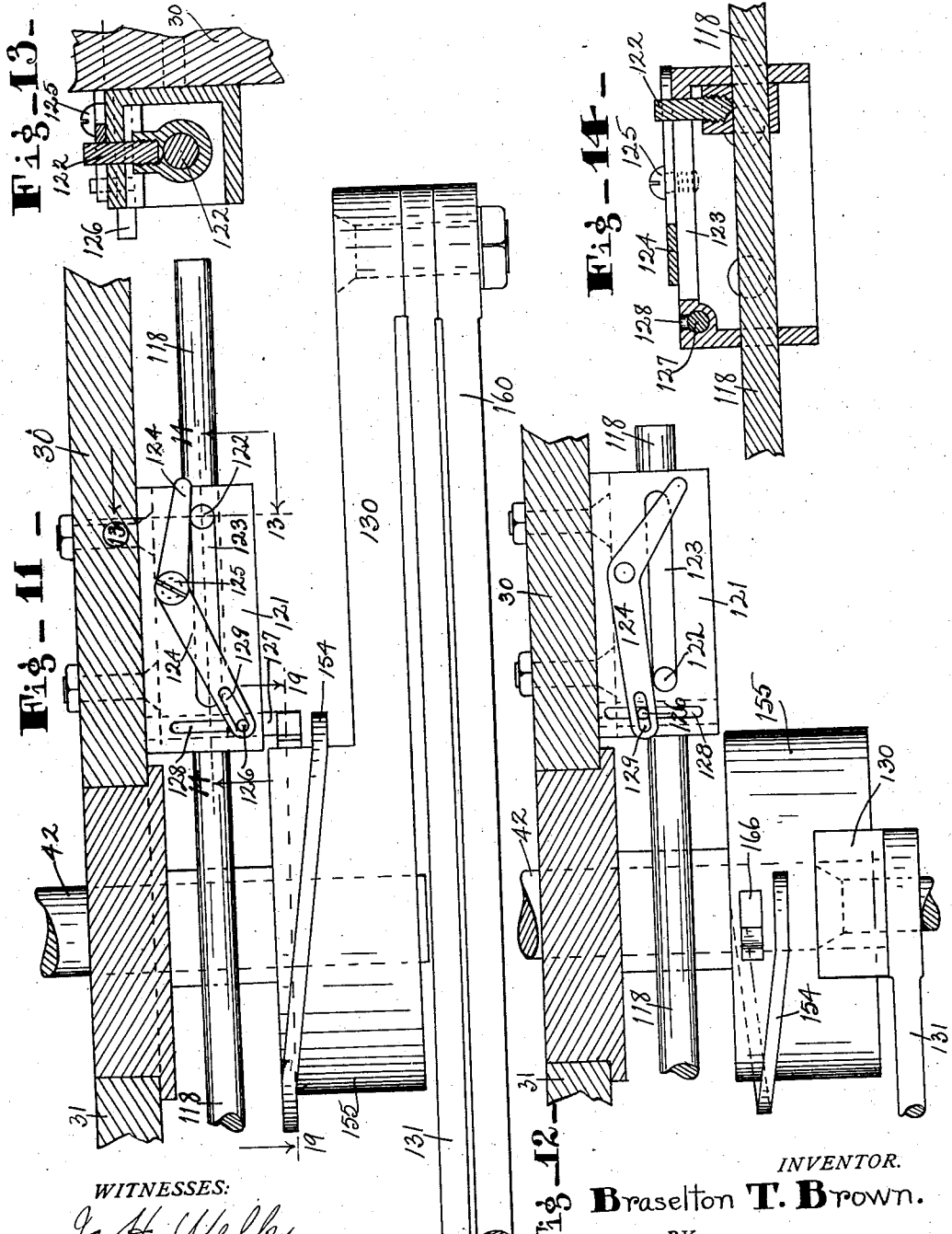

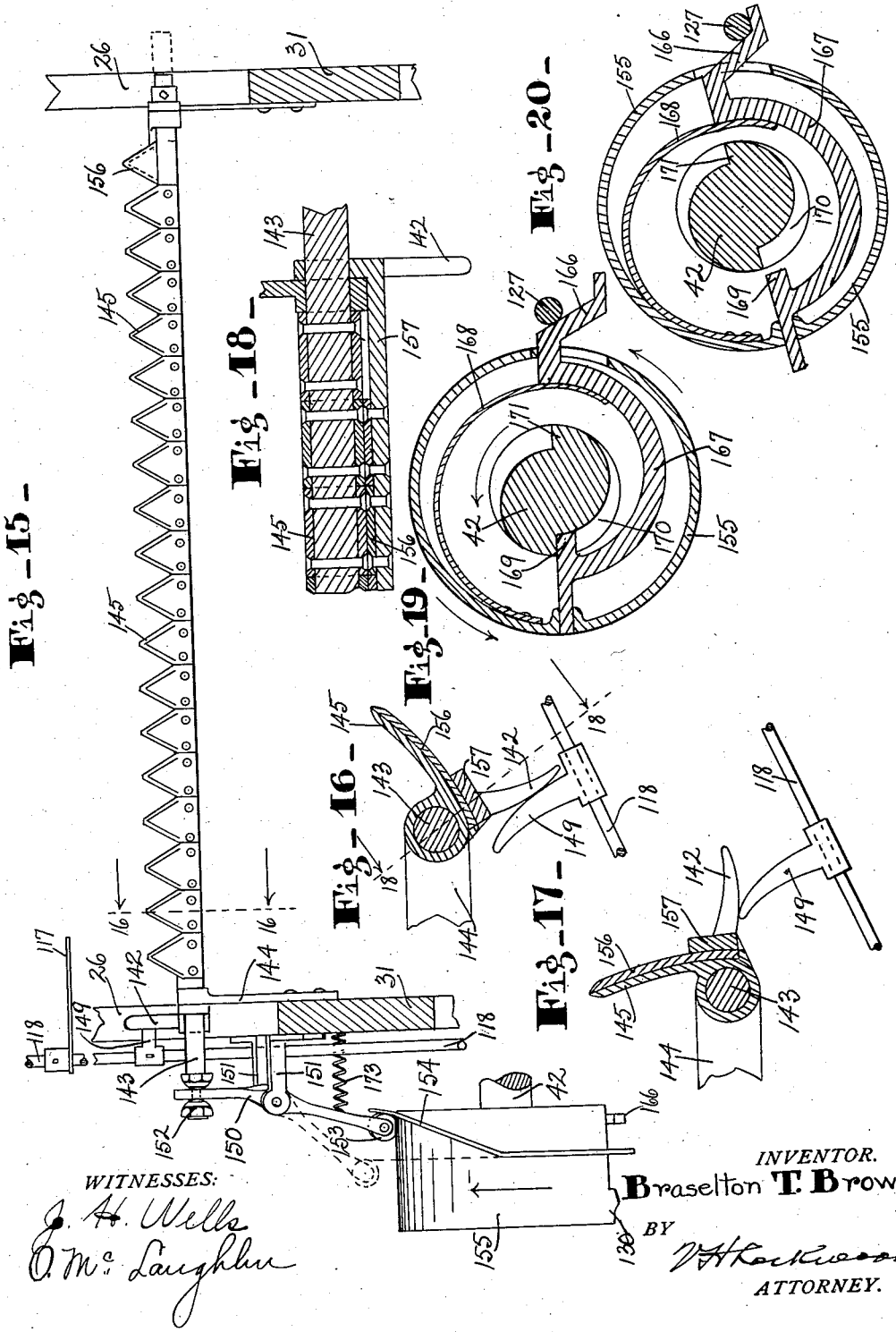

UNITED STATES PATENT OFFICE.

BRASELTON T. BROWN, OF INDIANAPOLIS, INDIANA.

BALER.

1,027,393.   Specification of Letters Patent.   Patented May 21, 1912.

Application filed October 13, 1910. Serial No. 586,846.

*To all whom it may concern:*

Be it known that I, BRASELTON T. BROWN, of Indianapolis, county of Marion, and State of Indiana, have invented a certain useful Baler; and I do hereby declare that the following is a full, clear, and exact description thereof, reference being had to the accompanying drawings.

The object of this invention is to provide an efficient and successful baler adapted to be attached to the discharge end of a threshing machine and capable of receiving the straw therefrom as fast as it is discharged and baling the same without in any way retarding or interfering with the operation of the threshing machine.

This baler is adapted to make a cylindrical bale, and to that end the baler spreads the column of straw issuing from the threshing machine between pressure rollers which mash all the straw flat and force the air out of the straw and makes it into a compact sheet, which is wound into a bale. By forcing the air out of the straw and mashing it flat into a sheet, the bale is reduced to its minimum limit of size and what would otherwise be a large volume of straw coming from the thresher is reduced to a very small bulk in the bale. This enables the baler to keep up with the threshing machine.

The nature of the invention will be understood from the accompanying drawings and the following description and claims.

In the drawings Figure 1 shows a side elevation of the rear portion of a threshing machine in dotted lines, and the baler in full lines attached thereto. Fig. 2 is a side elevation of a portion of the baling machine, showing the bale discharge lever mechanism, parts being broken away. Fig. 3 is a section on the line 3—3 of Fig. 2 without parts being broken away. Fig. 4 is an elevation of the left-hand side of the baler as one stands in front of it. Fig. 5 is an elevation of the right-hand side of the baler as one stands in front of it. Fig. 6 is a plan view of the baler. Fig. 7 is a central vertical section through a portion of the baler on the line 7—7 of Fig. 6 when the formation of the bale begins. Fig. 8 is the same after the bale has been formed and the sheet of straw severed prior to the discharge of the bale, the discharging position being indicated by dotted lines. Fig. 9 is a detail showing a portion of Fig. 8 on a larger scale and illustrating the means for severing the sheet of straw. Fig. 10 is a transverse section of a portion of the machine on substantially the line 10—10 of Fig. 6 and showing particularly the twister mechanism. Fig. 11 is a horizontal section through a part of the machine on the line 11—11 of Fig. 4, showing the bale discharging lever mechanism in its idle position, parts being broken away. Fig. 12 shows a part of what appears in Fig. 11 in actuated position. Fig. 13 is a section on the line 13—13 of Fig. 11. Fig. 14 is a section on the line 14—14 of Fig. 11. Fig. 15 is a horizontal section through a portion of the machine on the line 15—15 of Fig. 4 showing the sheet severing mechanism. Fig. 16 is a section on the line 16—16 of Fig. 15. Fig. 17 is the same as Fig. 16 in altered position. Fig. 18 is a section on the line 18—18 of Fig. 16. Fig. 19 is a section on the line 19—19 of Fig. 11 showing the clutching mechanism in one position. Fig. 20 is the same showing the clutch mechanism in altered position. Fig. 21 is a vertical section through a portion of the machine on the line 21—21 of Fig. 4.

In Fig. 1 a threshing machine 25 is indicated by dotted lines and the direction of the discharging movement of the straw is indicated by the arrows. The baling machine is secured to the rear or discharge end of the threshing machine by a pair of upper bars 26 and lower bars 27, see Fig. 1, so that the straw from the threshing machine will be discharged into the baling machine.

The baling machine has a general frame which is secured to the bars 26 and 27 and, as shown herein, integral therewith. This frame consists of two side frames similar in form, as shown in Figs. 4 and 5, one on each side, and there is a central cross bar 28 at the top and a rear cross bar 29, see Fig. 6. The side frames have a pair of vertical bars 30 and 31 near the rear end, as shown in Figs. 4 and 5, and also there is a brace bar 32 near the front end.

Power is applied to the drive wheel 33, see Figs. 4 and 5, by a belt running from some moving part of the threshing machine. Said wheel is on a shaft 34 which extends transversely through the machine, see Fig. 6, and is mounted on the lower frame bars thereof and is continuously operated. To the rear and somewhat above said shaft 34 the two compressing rollers 36 and 37 are mounted, see Fig. 7, and which have on one end of each the gears 38 and 39, respectively, see Fig. 4, which are concentric with the compressing rolls. The roll 36 and gear 38 have spindles 40 at each end mounted in bearing blocks 41, which are vertically slidable between the two bars 30 and 31, see Figs. 4 and 5. The gear 38 meshes with the gear 39 and the lower roll 37 and gear 39 are secured on a shaft 42, which is mounted in bearing blocks 43 fixed between the two bars 30 and 31, see also Figs. 4 and 5.

The lower roll 37 is driven by the pinion 44 on the shaft 45 extending transversely through the machine and mounted in the bearings 46, see Figs. 4 and 5. The shaft 45 is driven by a gear 47 on said shaft which meshes with a pinion 48 on the shaft 34. The gearing described is so arranged that the compressing rolls 36 and 37 are driven very slowly.

The means for receiving the column of straw from the threshing machine and spreading it and feeding it to the compressing rolls 36 and 37, is as follows: A number of feeding fingers 50 are mounted in front of the rolls and inclined upwardly toward the meeting point of the two rolls, as shown in Figs. 4 and 6. The forward and lower ends of said fingers are pivoted in a stationary bar 51 extending across the machine shown in Fig. 6. Said bar has a series of slots 52 through which the reduced ends of the fingers project and carry nuts 53 on their extreme ends. This mounting of said fingers is to enable their rear ends, near the rolls, to be oscillated. The oscillation or movement of the rear end of said fingers is effected by the cross bar 55, see Fig. 6, which at each end is pivoted to the vertical bars 56 and said vertical bars at their lower ends are pivoted to the stationary bars 57 which extend entirely across the machine. A connecting bar 58 is pivoted at one end to the upper part of one of the rods 56, see Fig. 6, and at the other end to a crank shaft 59 mounted in the bearings 60 and is driven by the bevel gear 61 which meshes with the bevel gear 62 on one end of the shaft 34. This crank shaft 59 gives the bar 55 a transverse reciprocatory rocking movement which causes the rear ends of the fingers 50 to have a curved movement laterally to and fro so that it is practically a double movement; namely, an upward and downward and also a lateral movement, and thus spreads and distributes the straw evenly as it approaches the compressing rolls 36 and 37.

The upper compressing roll 36 is pressed down tightly upon the lower roll 37 by leaf springs 63 which extend entirely across the machine and at each end bear down on the block 64 which rides upon the bearing blocks 41. The tension of said spring is regulated by a screw 65 which operates through the top cross plate 28 and is actuated by a short crank 66.

A sheet of straw will issue from between the two compressing rolls 36 and 37 as wide as the rolls will permit and have all the straws in it mashed flat and all the air forced out of the straws so that the sheet will be very compact. On each side of the sheet of straw the machine has a vertical guide plate 67 of sheet metal, as seen in Fig. 6. These metal guide plates are not shown in Figs. 4 and 5 and the other figures because they would obscure and complicate the drawings and said plates are not necessary.

The bale forming mechanism will now be explained.

As seen in Fig. 7, a sheet of straw 68 which has issued from the rolls is carried over a roller 69 extending across the machine and lying immediately behind the meeting point of the two rolls 36 and 37. At each end said roller 69 has spindles 70 which are mounted in the sides of the frame. Behind said roller 69 and substantially in the same horizontal plane as the axes of said roller and the contact between the two rolls 36 and 37, there is a pair of bale forming twisters 270, see Fig. 10, one mounted at each side of the machine and projecting inwardly like a fork with two straight prongs, as shown by dotted lines in Fig. 10, which is the normal winding position. These twisters engage the two lateral ends of the advancing sheet of straw and begin twisting the same and cause the sheet to assume the position shown in Fig. 7 and start the bale 71. In the starting and also in the formation of the bale from beginning to end an endless belt of canvas 72 coöperates with the twisters 270. This belt of canvas is mounted on the series of rollers 73, 74, 75, 76 and 77, which extend entirely across the machine. The roller 73 has a spindle 78 at each end, see Figs. 4 and 5, which is mounted in the ends of a pair of arms 79 pivoted to the projection 80 from the frame.

The rollers 74 and 76 have spindles 81 at the ends mounted in bearings on the ends of spring rods extending from their respective rollers toward each other and attached to the frame at 83, and near their attachment to the frame they are coiled at least once at 84, the arrangement being such that the spring bars 82 tend to press the rollers 74 and 76 rearwardly and keep the canvas sheet taut. The roller 75 is also so mounted as to keep the canvas sheet taut and also to adjust the canvas sheet to suit the increasing bale, so the roller 75 also has spindles 85 which project through slots 86 in a bar 87 of the frame, see Fig. 7. The spindles 85 project into rods 88 which are slidable in connection with the plates 87 and are connected to flat springs 89 which are secured to the rear cross bar 29 of the frame, as seen in Fig. 6, so that said springs tend to push the bars 88 rearwardly and thus force the roller 75 rearwardly.

The roller 77 has spindles like the other rollers but which do not appear on the drawings and which are mounted in the arms 91, see Fig. 5, which project rearwardly from the bearing blocks 41. The roller 77, therefore, is vertically movable along with the compressing roll 36. The roller 77 is immediately to the rear of the roll 36 and over the rear portion of the roller 69 and close to the same so that the canvas 72 will rather closely approach the sheet of straw 68 and maintain about the same relation thereto at all times, being modified only by the thickness of the column of straw as it comes over the roll and which forces the roller 36 upwardly, and, therefore, elevates the roller 77 accordingly.

The sheet of canvas or endless belt 72 is as wide as the rolls are long and the length of the bale to be formed and is moved or revolved in the direction indicated by the arrow in Fig. 7 by the means shown in Fig. 5, and such movement of the sheet or belt causes the sheet of straw to be wound into a bale after the bale has been started, as shown in Fig. 7. In Fig. 5 a sprocket chain 180 runs from the sprocket wheel 181 immediately inside of the pinion 108 and at the rear passes over the sprocket wheel 182, which has a spindle 183 mounted in the frame and on said spindle there is another sprocket wheel, not shown, inside of the sprocket wheel 182 over which the vertical sprocket chain runs over the sprocket wheel 185 at the end of the upper roller 76 and a sprocket wheel 186 at the end of the lower roller 74. By this means the canvas sheet 72 is kept revolving.

The twisters 270 are driven by the following means: They are mounted on the shaft 92 which is mounted in a bar 93, the rounded lower end of a rod 94 and the lower end of a bar 95, which at its upper end is secured to the rod 94. It is held in position in said parts by the collars 96 and 97, the latter one of which secures the gear 98 to said twister shaft 92. The frame composed of the parts 93, 94 and 95, in which the twister shaft 92 is mounted, is vertically movable on a frame or bar 100, which is secured by the rivets 101 to the turned-down end 102 of the rod 103, which telescopes with the tube 104, which extends across the machine and is fixed in position. The upper end of the bar 93 slides on the bar 100. The rod 94 slides through the upper and lower horizontal parts of the frame or bar 100 and the bar 95 is slidable with relation to the extreme outer end of the lower part of the frame or bar 100. The frame composed of the parts 93, 94 and 95 is held normally upward by the spring 105, which surrounds the rod 94 and bears on the horizontal portion of the bar or frame 100 below and upwardly against the pin 106 in the rod 95. Therefore, the spring 105 tends to hold the twisters and the bale toward and close to the rollers 76 and 77 and to yield as the bale increases, see Figs. 7 and 8. Also the frames in which the twister shafts are mounted are enabled to swing by means of the mounting of the rod 103 and tube 104 from the position indicated in Fig. 7 to that shown in Fig. 8 as the bale increases. There are two tubes 104 lying side by side, see Fig. 6, so that one rod 103 at one side of the machine extends in one of said tubes and the other rod extends in the other tube. A weight 107 on the outer end of each twister shaft 92 holds the twister 270 in normal position when it is idle. The twisters 270 are directly actuated by the gears 98 only while the bale is being started, see Fig. 4. There the gear 98 meshes with the gear 108 secured to one end of the roller 69, whose spindles are mounted in a pair of brackets 109 from the arms 91. The gear 108 meshes with the gear 38, whereby it and the roller 69 are driven constantly and the twisters are driven by them until the bale becomes large enough to cause the gear 98 to separate from the gear 108. During the remaining period of the formation of the bale it is turned by the canvas 72.

A deflecting plate 110 is secured between the two arms 91 and bears against the rear under surface of the upper compressing roll 36, as shown in Fig. 7, to prevent the straw from passing up between said roll and the roller 77.

The mechanism so far described will eventually cause the formation of the bale, as shown in Fig. 8. During the latter part of the formation of the bale means for binding it is provided, which accomplishes its work without the use of a tie, wire or straw band, although the use of this machine is not limited to any particular means or manner of binding or tying the bale. The means herein shown, however, for that purpose consists of a roller 115 extending across the machine and guided by spindles in the frame work so as to be in fixed position where it will be engaged by the bale after it has become rather large. The roller 115 has a number of fingers 116 projecting radially therefrom adapted to penetrate the bale through more than one layer of straw, and, therefore, to press some straw from one layer into the next layer or layers. As shown in Fig. 7, at the beginning of the formation of the bale the binder is not in contact with the bale, but after the bale is about half formed it will come in contact with the binder, and during the formation of the latter part of the bale the binder will continually knit some straw from the outer layer into the inner layers, and when this is continued until several layers are wound on the bale, the bale will maintain its form without any metal tie, twine or straw band.

When the bale is large enough, the sheet of straw coming from the two compressing rolls is severed by the following means: When the bale becomes large it causes the canvas 72 to engage a plate 117 on the forward end of a rod 118 forming a part of a trip mechanism. The rod is slidable in a bearing 119, which is fixed to the frame and is held normally in its forward position by a spring 120, which is around the rod and presses the outer end of the rod and plate 117 away from the bearing. The rod 118 is mounted on the side of the machine with the rear end moving in the bearing 119 mentioned before, and the forward lower end operating through a bearing box 121 secured to the frame, as shown in Figs. 3 and 11. The plate 117, which is secured to the rod 118, projects inwardly from the rod to a position where it will be engaged by the canvas as the bale becomes large. The rod 118 has a pin 122 in it, see Fig. 11, which projects up through a slot 123 in the box 121. When the rod 118 is moved to the left from the position shown in Fig. 11, the pin 122 engages the longer end of the bell crank lever 124, which is fulcrumed to the box 121 by the pin 125 and causes said arm of the lever 124 to push the pin 126 over from the position shown in Fig. 11 toward the position shown in Fig. 12. The pin 126 is secured to a trip 127 which is slidable in the bearing box 121, as shown in Figs. 11 and 14. The pin 126 also projects up through the slot 128 extending transversely of the bearing box 121 and through a slot 129 in the bell crank lever 124. When the parts are in the position shown in Fig. 12, the trip 127 will have disengaged the clutch and then the crank 130 on the shaft 42 of the lower compression roll 37 is clutched into engagement with said shaft and operates and as it operates it pushes the rod 131, which is pivoted to said crank, rearwardly, see Fig. 6. Said rod 131 is pivoted to the bell crank lever 132, which is fulcrumed to the bracket 133 on the frame and the other end of the bell crank lever is connected by the rod 134 with one end of the horizontal lever 135, which is fulcrumed at 136 between its ends to a bar 137, which extends across the top of the frame. The connecting bar 138 is pivoted to said lever 135 at one end and at the other end to the upper part of the bar or frame 100, see Fig. 10, and thereby the twister mechanism shown in Fig. 10 is moved from the dotted line position to the full line position to cause the twister to disengage the bale. The other end of the lever 135 is connected by a rod 140 with the frame 100 on the other side of the machine so as to remove the other twister from the bale simultaneously.

At the same time that the twisters are disengaged from the bale, the cutting mechanism is operated. As the rod 118 is pushed rearwardly by the bale and canvas, as explained, an arm 149 secured thereon, see Fig. 16, engages an arm 142 on the bar 157, which at each end is mounted on the knife bar 143 mounted in the brackets 144 at each side of the machine. Said knife bar 143 carries knives 145 and the part is normally in the position shown in Fig. 7, which is out of engagement with the sheet of straw 68 and lying idle against the roller 69; but when the projection or trip 149 engages the projection or trip 142, the parts will be moved into the position shown in Fig. 8, which throws the knife up against the sheet of straw, as shown in Fig. 8. When this happens the knife bar is given a longitudinal movement by the lever 150 which is fulcrumed between its ends to the arm 151 extending outwardly from the frame, see Fig. 15. One end of this lever is forked and fits astride the knife bar 143 between the nuts 152. The other end of the lever 150 carries a roller 153 which engages a cam flange 154 on the drum 155, which surrounds the shaft 42 and is integral with the crank 130, see Figs. 11 and 12. Therefore, when the crank 130 operates, the lever 150 is thrown to the dotted line position shown in Fig. 15 and the knife is reciprocated and severs the sheet of straw, as shown in Fig. 8.

The lower series of stationary knives 156 are secured to the bar 157 and they do not reciprocate longitudinally but they do coöperate with the knives 145 as they reciprocate, and thus the straw caught between said V-shaped knives 145 and 156 will be severed.

As the crank 130 proceeds to revolve, it pushes rearwardly the rod 160, which is reciprocable in the plate 161, which has a rod 162 projecting into the machine transversely thereof about half way through, as shown in Fig. 6, and carries a roller 163 on the end thereof, which lies against the roller 73. The rod 162 passes through an arm 79 on which the roller 73 is mounted. As the crank 130 still further operates, the rod 160 and rod 162 will push the arm 79 and roller 73 down from the position shown in Fig. 4 out of the path of the discharging bale, as indicated by dotted lines in Fig. 8. There is a spring 164 connecting the rod 160 with the plate 161 yieldingly, so that time will be given for the knife to sever the sheet of straw before the discharge of the bale occurs. When the roller 73 is thrown down to the dotted line position shown in Fig. 8, there is nothing left to support the bale, as the canvas 72 is then out from under the bale, and hence the bale discharges by gravity. After the bale has been discharged the trip rod 118 is relieved and the spring 120 causes it to move back from the position shown in Fig. 12 to that shown in Fig. 11, and as it does so the trip 122 engages the forward end of the lever 124 and throws the trip 127 out into the position indicated in Fig. 11 so as to engage the inclined surface of the projection 166 of a clutch 167, which is radially slidable in the drum 155, see Fig. 19, and is held in its outer position, as shown in Fig. 19, by the spring 168, which is secured to the inner surface of the drum. The spring 168 throws the clutch 167 into clutching position, as seen in Fig. 19, that is, it causes the tooth 169 to enter one of the grooves 170 in the shaft 42 and engage the clutch shoulder 171. The further movement of the crank 130, however, will move the parts to the position shown in Fig. 20 in which the trip pin 127 forces the clutch 167 rearwardly out of clutching position, and then the crank 130 ceases to operate further, and the parts are held in that position until another bale has been formed and the trip 127 is again disengaged from the clutch 167, as shown in Fig. 12. The operation of the crank 130 also turns the drum 155 so that the cam flange 154 will permit the spring 173 to return the lever 150 and thereby return the knives 145 to their normal position. The spring 173 extends from one arm of the lever 150 to the frame. Preceding this, however, the return movement of the rod 118 from the position shown in Fig. 17 to that shown in Fig. 16 throws the knives from the position shown in Fig. 8 to that shown in Fig. 7.

During the severing of the sheet of straw and the discharge of the bale, the knives have been in the position shown in Fig. 8 and the straw will have come against said knives and accumulated somewhat, so that when the knives are thrown back to the position shown in Fig. 7 the enlarged advancing end of the sheet of straw will be engaged by the inward movement of the twisters 270 as they move inward from the full line position shown in Fig. 10 to the dotted line position, and this is caused by the return movement of the crank 130, which has just been described. Then another bale is formed and the process described is repeated. Thus it is seen that the bales are automatically formed, severed and discharged rapidly and there is but a slight interim between bales, so that the movement of straw is not choked. The machine is automatically adjustable to accommodate reasonable variations in the size of the bales, so that it will bale the straw whether it comes slow or fast. The faster the straw issues from the threshing machine, the thicker will be the sheet of straw. The diameter of the bales would be uniform, but they would be more rapidly formed and discharged when the straw comes through fast than when it comes through slow.

I claim as my invention:

1. A baler including compression rolls for forming material into a sheet, means for coiling the sheet into a bale after it has left said rolls, and a roller provided with radially extending fingers adapted to be engaged by the bale when it becomes large, whereby the fingers will force some material from the outer layer at a plurality of points through an inner layer and thus knit the outer layers together.

2. A baler including compression rolls through which the material is adapted to be passed and whereby it is pressed into a sheet, means for forming the sheet after it leaves said rolls into bales, a series of fingers in front of the rolls and projecting toward the meeting point, and means for giving said fingers lateral and vertical movement for distributing the material as it approaches the rolls.

3. A baler including compression rolls through which the material is adapted to be passed and whereby it is pressed into a sheet, means for forming the sheet after it leaves said rolls into bales, a series of fingers in front of the rolls and projecting toward the meeting point, means in which the other ends of the fingers are loosely mounted, a bar in which the fingers are loosely mounted intermediate their ends, and means for giving said bar an upwardly curved rocking movement transversely of the device.

4. A baler including compression rolls through which the material is adapted to be passed and whereby it is pressed into a sheet, means for forming the sheet after it leaves said rolls into bales, a series of fingers in front of the rolls and projecting toward the meeting point, means in which the other ends of the fingers are loosely mounted, a bar in which the fingers are loosely mounted intermediate their ends, connecting bars pivoted at their upper ends to said cross bar and pivoted at their lower ends to the frame, and means for giving said cross bar reciprocatory movement transversely of the machine.

5. A baler including a pair of compression rolls one mounted above the other and between which the material is passed and whereby it is crushed into a sheet, a spring for forcing one of said rolls against the other, means for forming the sheet after it leaves the rolls into bales, and spreading fingers in front of the rolls and projecting at an upward inclination toward the meeting place of the rolls, and means for giving said spreading fingers lateral movement to and fro.

6. A baler including a pair of compression rolls one located above the other and between which the material is adapted to be moved horizontally and crushed into a sheet, a roller located behind and in substantially the same horizontal plane as the meeting point of said rolls and over which the sheet of material is adapted to move, another roller behind the upper roll and on a higher level than said first-mentioned roller, a third roller on a lower level than said first-mentioned roller, a wide endless belt running over said two last-mentioned rollers so as to extend almost vertically behind and close to said first-mentioned roller, means for permitting said belt to yield, and means located between said belt and first-mentioned roller for receiving the advancing end of the sheet of material and coiling it into a round bale.

7. A baler including a pair of compression rolls one located above the other and between which the material is adapted to be moved horizontally and crushed into a sheet, a roller located behind and in substantially the same horizontal plane as the meeting point of said rolls and over which the sheet of material is adapted to move, another roller behind the upper roll and on a higher level than said first-mentioned roller, a third roller on a lower level than said first-mentioned roller, a wide endless belt running over said two last-mentioned rollers so as to extend almost vertically behind and close to said first-mentioned roller, means for permitting said belt to yield, means located between said belt and first-mentioned roller for receiving the advancing end of the sheet of material and coiling it into a round bale, and means for driving said belt in a direction so as to cause a winding revolution of the bale as it is being formed.

8. A baler including a pair of compression rolls one located above the other and between which the material is adapted to be moved horizontally and crushed into a sheet, a roller located behind and in substantially the same horizontal plane as the meeting point of said rolls and over which the sheet of material is adapted to move, another roller behind the upper roll and on a higher level than said first-mentioned roller, a third roller on a lower lever than said first-mentioned roller, a wide endless belt running over said two last-mentioned rollers so as to extend almost vertically behind and close to said first-mentioned roller, means for permitting said belt to yield, means located between said belt and first-mentioned roller for receiving the advancing end of the sheet of material and coiling it into a round bale, and means controlled by the bale being formed for moving said lower belt roller out of the way when the bale is finished, so that the bale can discharge by gravity.

9. A baler including a pair of compression rolls one located above the other and between which the material is adapted to be moved horizontally and crushed into a sheet, a roller located behind and in substantially the same horizontal plane as the meeting point of said rolls and over which the sheet of material is adapted to move, another roller behind the upper roll and on a higher level than said first-mentioned roller, a rear pair of rollers one below the other, yielding means for mounting said rollers so that they may move toward or away from the compression rolls, a wide endless belt surrounding all of said rollers excepting the first-mentioned roller and closely approaching the first-mentioned roller, means for actuating said belt, and means between said belt and first-mentioned roller for engaging the advancing end of the sheet of material and winding it whereby as the bale increases the rear rollers will yield.

10. A baler including a pair of compression rolls one located above the other and between which the material is adapted to be moved horizontally and crushed into a sheet, a roller located behind and in substantially the same horizontal plane as the meeting point of said rolls and over which the sheet of material is adapted to move, another roller behind the upper roll and on a higher level than said first-mentioned roller, a rear pair of rollers one below the other, another roller mounted at the rear end of the machine and adapted to yield, a spring tending to force said last-mentioned roller in a direction away from the compression rolls, a wide endless belt surrounding all of said rollers excepting the first-mentioned roller and vertically disposed near the first-mentioned roller, and means located between said belt and first-mentioned roller for engaging the advancing end of the sheet of material and coiling it into a bale whereby the belt will be kept taut at all times and will yield as the bale increases.

11. A baler including a pair of compression rolls one mounted above the other and between which the material is passed and whereby it is crushed into a sheet, a roller located behind said rolls and over which the sheet of material is adapted to move, a number of other rollers located behind said rolls, a wide endless belt mounted on all of said rollers excepting the first one and arranged so as to extend substantially vertical in relation to said first-mentioned roller, means for operating said belt, means located between the first-mentioned roll and belt for engaging the advancing end of the sheet of material and coiling it into a bale and arranged so that when the bale starts it will be held between the belt and first-mentioned roller, and another roller located on a lower level than said first-mentioned roller and out of engagement with the bale when it starts but which said bale engages after it has been partially formed, and fingers projecting radially from said last-mentioned roller and adapted to penetrate the bale as it turns and knit the layers of material together.

12. A baler including a pair of compression rolls one mounted above the other and between which the material is passed and whereby it is crushed into a sheet, twisting means located behind said rolls for engaging the advancing end of the sheet of material and coiling it into a bale, means at each side of the machine for mounting said twisting means arranged so as to yield as the bale increases, and a wide yielding movable belt in position to engage the bale as it is being formed.

13. A baler including a pair of compression rolls one mounted above the other and between which the material is passed and whereby it is crushed into a sheet, twisting means located behind said rolls for engaging the advancing end of the sheet of material and coiling it into a bale, a frame at each side of the machine in which said twisting means is mounted, means for suspending said frames so that the twisting means can yield away from said rolls as the bale increases in diameter, and a wide yielding movable belt in position to engage the bale as it is being formed.

14. A baler including a pair of compression rolls one mounted above the other and between which the material is passed and whereby it is crushed into a sheet, a forked twister at each side of the machine and behind said rolls in position to engage the advancing end of the sheet of material, means for rotating said twisters, and means for laterally withdrawing said twisters from the bale when it is finished.

15. A baler including a pair of compression rolls one mounted above the other and between which the material is passed and whereby it is crushed into a sheet, a forked twister at each side of the machine and behind said rolls in position to engage the advancing end of the sheet of material, a frame in which each of said twisters is mounted which is arranged so as to swing rearwardly and also to move laterally, means for rotating said twisters, and means for laterally moving said swinging frames to disengage the twisters from the bale when finished.

16. A baler including a pair of compression rolls one mounted above the other and between which the material is passed and whereby it is crushed into a sheet, a forked twister at each side of the machine and behind said rolls in position to engage the advancing end of the sheet of material, a frame in which each of said twisters is mounted, tubes extending transversely of the machine, rods adapted to telescope in said tubes and on the outer end of which said twister frames are mounted so that they may swing rearwardly and be moved laterally, and means for laterally moving said swinging frames to disengage the twisters from the bale when finished.

17. A baler including a pair of compression rolls one mounted above the other and between which the material is passed and whereby it is crushed into a sheet, a forked twister at each side of the machine and behind said rolls in position to engage the advancing end of the sheet of material, a frame in which each of said twisters is mounted, tubes extending transversely of the machine, rods adapted to telescope in said tubes and on the outer end of which said twister frames are mounted so that they may swing rearwardly and be moved laterally, means for laterally moving said swinging frames to disengage the twisters from the bale when finished, and a weight depending from each of said twisters for returning it to its normal position when out of the bale.

18. A baler including a pair of compression rolls one mounted above the other and between which the material is passed and whereby it is crushed into a sheet, a forked twister at each side of the machine and behind said rolls in position to engage the advancing end of the sheet of material, a frame in which each twister is mounted, means for rotating the twisters, transverse rods adapted to telescope in said tubes, a guide frame secured to the outer end of each rod in connection with which the twister frame is mounted so as to be vertically slidable, and a spring which tends to force said twister frame downwardly.

19. A baler including a pair of compression rolls one mounted above the other and between which the material is passed and whereby it is crushed into a sheet, a forked twister at each side of the machine and behind said rolls in position to engage the advancing end of the sheet of material, a frame in which each of said twisters is mounted, tubes extending transversely of the machine, rods adapted to telescope in said tubes and on the outer end of which said twister frames are mounted so that they may swing rearwardly and be moved laterally, means for laterally moving said swinging frames to disengage the twisters from the bale when finished, and means controlled by the bale being formed for moving said twister frames and twisters laterally when the bale is finished.

20. A baler including a pair of compression rolls one mounted above the other and between which the material is passed and whereby it is crushed into a sheet, a forked twister at each side of the machine and behind said rolls in position to engage the advancing end of the sheet of material, a frame in which each of said twisters is mounted, tubes extending transversely of the machine rods adapted to telescope in said tubes and on the outer end of which said twister frames are mounted so that they may swing rearwardly and be moved laterally, means for laterally moving said swinging frames to disengage the twisters from the bale when finished, and a wide endless belt adapted to engage the bale as it is being formed, rollers in which said belt is mounted one of which is below the bale forming position and which is movable away from under the bale when formed, means for operating the belt, means for simultaneously removing said lower roller and disengaging said twisters from the bale when finished.

21. A baler including means for feeding the material to be baled in a sheet, means adapted to start the advancing sheet to coiling into a bale, a constantly moving canvas sheet which engages the periphery of the bale after it has been started and continuously revolve the bale until it is formed, and means for forcing the bale as it is being formed toward the canvas sheet so that the surface engagement between the canvas sheet and bale will increase in proportion to the increase of the size of the bale.

22. A baler including means for feeding the material to be baled in a sheet, means adapted to start the advancing sheet to coiling into a bale, a constantly moving canvas sheet which engages the periphery of the bale after it has been started and continuously revolve the bale until it is formed, a pair of rollers on the opposite sides of said bale over which said canvas sheet passes, and means for forcing the bale as it is being formed toward the canvas sheet and away from between said rollers so that when the bale becomes large the canvas sheet will engage the major portion of the periphery of the bale.

In witness whereof, I have hereunto affixed my signature in the presence of the witnesses herein named.

BRASELTON T. BROWN.

Witnesses:
G. H. BOINK,
J. H. WELLS.

---

Copies of this patent may be obtained for five cents each, by addressing the "Commissioner of Patents, Washington, D. C."